United States Patent [19]

Redzinski

[11] Patent Number: 4,463,842

[45] Date of Patent: Aug. 7, 1984

[54] LOCKUP CONTROL SYSTEM FOR TORQUE CONVERTER

[75] Inventor: Gilbert E. Redzinski, Niles, Mich.

[73] Assignee: Clark Equipment Company, Buchanan, Mich.

[21] Appl. No.: 331,053

[22] Filed: Dec. 16, 1981

[51] Int. Cl.³ ..................... B60K 41/28; F16H 45/02
[52] U.S. Cl. ............................. 192/0.052; 192/3.31
[58] Field of Search ............... 192/0.075, 0.076, 0.096, 192/0.04, 0.052, 3.3, 3.31, 3.29, 3.28, 3.58, 3.57; 74/731, 732

[56] References Cited

U.S. PATENT DOCUMENTS

| | | | |
|---|---|---|---|
| 4,027,554 | 6/1977 | Ito et al. | 74/866 |
| 4,270,636 | 6/1981 | Sunohara et al. | 192/3.31 |
| 4,274,306 | 6/1981 | Yokoi et al. | 74/866 |

Primary Examiner—George H. Krizmanich

Attorney, Agent, or Firm—Reising, Ethington, Barnard, Perry & Milton

[57] ABSTRACT

A control circuit is disclosed for automatic lockup of a torque converter in the driveline of a work vehicle. The primary control for engaging the lockup clutch is a speed signal corresponding to the speed of the output shaft of the torque converter. A speed responsive signal generator produces a lockup signal at a first set-point when the torque demand is at a higher value and has a lower speed set-point for producing a lockup signal when the torque demand is at a lower value. A transmission responsive signal generator produces an enabling signal for torque converter lockup when the transmission is in forward drive above the first speed range. Shift of the transmission from one drive range to another produces a momentary disenabling signal to cause the lockup clutch to be disengaged and minimize driveline shock. Overspeed signal generator produces a disenabling signal to cause disengagement of the lockup clutch in an overspeed condition.

11 Claims, 4 Drawing Figures

LOCKUP CONTROL SYSTEM FOR TORQUE CONVERTER

FIELD OF THE INVENTION

This invention relates to an automatic control system for the power train of a work vehicle; more particularly, it relates to an automatic system for a torque converter lockup.

BACKGROUND OF THE INVENTION

In construction vehicles of either the on or off-highway type, the vehicle engine is typicaly coupled with the traction wheels through a fluid torque converter and a change speed transmission. The fluid torque converter provides torque multiplication which is required when the vehicle is in a working mode, e.g. a front-end loader filling its bucket. When the vehicle is operated in a travel mode, the torque multiplication is not needed and, if it remains in the driveline, the torque converter operates with slippage and introduces power loss. To avoid this condition, it is common practice to provide the torque converter with a lockup clutch which bypasses the torque converter and providea d direct mechanical connection between the engine and the transmission. A typical lockup clutch is hydraulically actuated under the control of a solenoid valve.

The torque converter lockup clutch, as most commonly used in the prior art, is manually controlled by the vehicle operator. Converter lockup must be used selectively and the degree of effectiveness and efficiency of vehicle operation depends upon the judgment of the operator. For example, the torque converter should be operated in lockup under certain travel conditions at the work site or when the vehicle is on the highway between work sites; it should be operated in the unlock condition when the vehicle is in a work mode. It is difficult for the operator to initiate change between lockup and unlock conditions at the optimum converter speed to achieve the most efficient operation. Further, there are certain operating conditions in which proper use of converter lockup contributes to safety in vehicle operation and the avoidance of unnecessary wear or damage to the vehicle driveline.

A prior art converter lockup control system for a construction vehicle is shown in my U.S. Pat. No. 4,148,231. In that control sytem, manual control is provided for selective lockup and unlock by the vehicle operator. Further, that system includes automatic control for momentary unlock of the torque converter during each upshift and downshift above a certain speed range. There are other patents, such as Heino U.S. Pat. No. 4,208,929, Schneider et al. U.S. Pat. No. 3,805,640 and Akeson et al. U.S. Pat. No. 4,015,488 which disclose torque converter lockup in conjunction with automatic shift control for a change speed transmission.

A torque converter lockup control system for use on motor vehicles is disclosed in Miller et al. U.S. Pat. No. 2,646,864. This system provides for engaging lockup at a predetermined engine speed and for disengaging the lockup at a lower speed if the torque demand on the engine is high. The torque converter is locked up at low speeds when the torque demand is low. Under certain conditions, engine braking is obtained by converter lockup until low speed is reached by means of a holding coil energized by the vehicle generator.

In the Schneider U.S. Pat. No. 3,805,640, a drive train is provided with a hydraulic retarder which is engaged when going downhill in converter lockup with overspeeding. The retarder is kept engaged until the lockup clutch is disengaged.

A general object of this invention is to provide torque converter lockup control systems which overcomes certain disadvantages of the prior art.

SUMMARY OF THE INVENTION

In accordance with this invention, an automatic control system is provided for a torque converter lockup clutch. the control system is responsive to different operating parameters to change the clutch between lockup and unlock conditions and obtain optimum performance. In general, the automatic control system causes the vehicle driveline to operate in the unlock condition when the vehicle is in the working mode and requires torque multiplication by the torque converter. When the vehicle is in the travel mode the control system causes the driveline to operate in the lockup condition to enhance efficiency of operation. The changeover point between unlock and lockup is determined, in part, by the torque demand on the engine. This provides for engine braking in the driveline under certain operating conditions. Additionally, engine overspeed is inhibited under certain conditions by engaging torque converter lockup. Further, the operation of the automatic control system is dependent upon the operating condition of the change speed transmission, i.e. forward or reverse and the selected drive range.

The automatic control system of this invention comprises, a speed signal generator coupled with the driveline, perferably the torque converter output shaft, for producing a speed signal. A speed responsive signal means is responsive to the speed signal to produce a lockup signal when it exceeds a reference value and an unlock signal when it is less than the reference value. The reference signal is changed between first and second predetermined values by switching means actuated in response to torque demand on the engine. Accordingly, the lockup actuator for the clutch receives either a lockup or an unlock signal depending upon the speed signal and the torque demand signal.

Further, in accordance with this invention, a first comparator is connected with the speed signal generating means and with the reference signal means for producing a lockup or an unlock signal. Logic means having one input coupled with the first comparator has its output coupled with the lockup actuator. A second comparator has a first input coupled with the speed signal generator and a second input coupled with a reference signal means which provides a signal corresponding to overspeed. The second comparator is adapted to produce an enabling signal when the speed signal is less than the overspeed reference signal and a disenabling signal when the speed signal is greater than the overspeed reference signal. The output of the second comparator is supplied to the logic means to enable lockup when the engine is in an overspeed condition. Further, according to the invention, a transmission responsive signal means is responsive to the shift controller of the change speed transmission and includes second logic means for producing an enabling signal or a disenabling signal under selected operating conditions. The output of the second logic means is applied to the first logic means for enabling or disenabling torque converter lockup under certain conditions. Additionally, the automatic control system is provided with time delay means to prevent untimely or unwanted changeover of the lockup clutch.

A more complete understanding of this invention may be obtained from the detailed description that follows taken with the accompanying drawings.

BEST MODE FOR CARRYING OUT THE INVENTION

Figure 1:
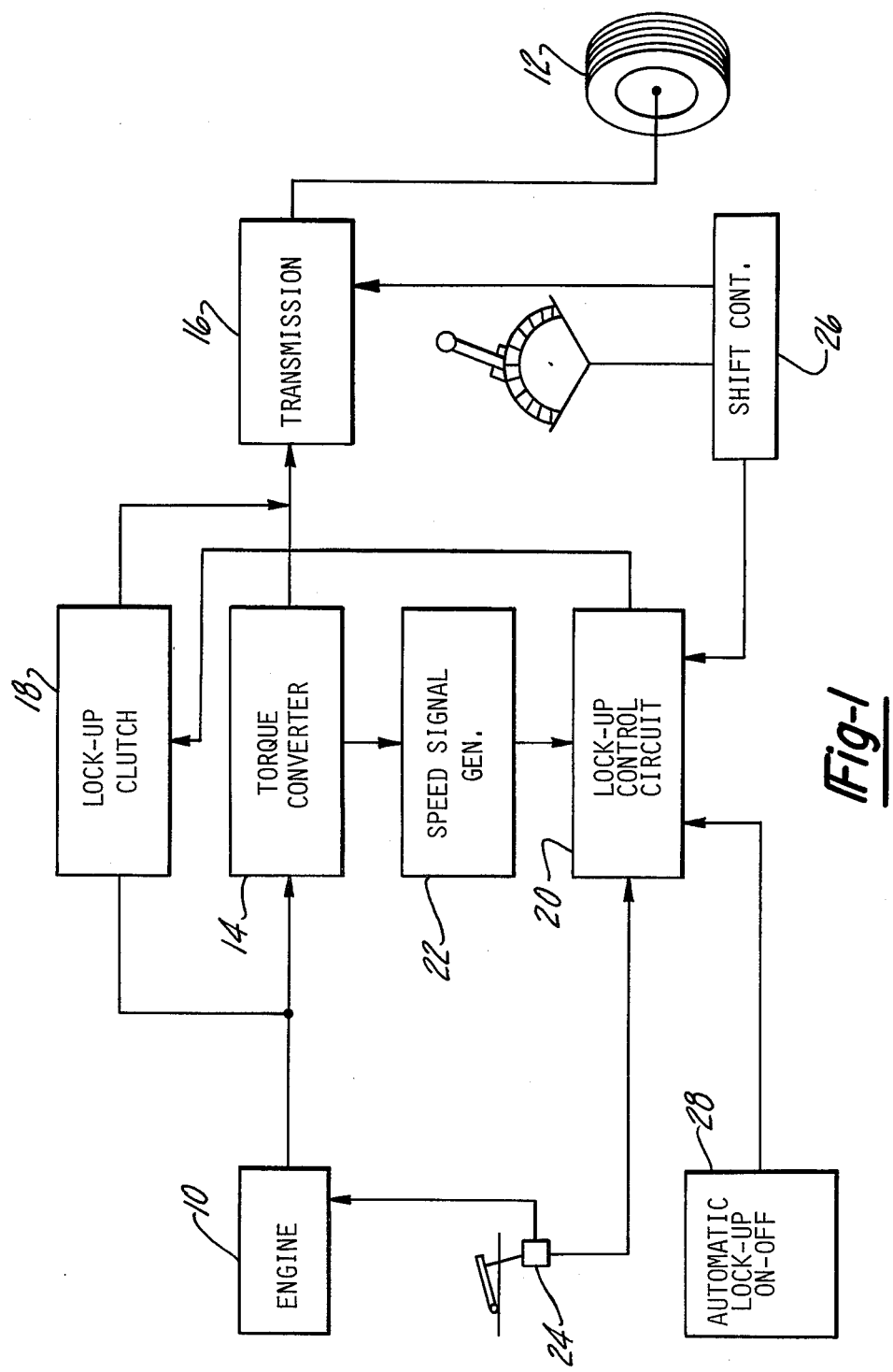
FIG. 1 is a block diagram of a vehicle drive train including the inventive lockup control circuit.

Referring now to the drawings, there is shown an illustrative embodiment of the invention in an automatic lockup control circuit for the driveline of a construction vehicle, for example, an earth moving vehicle such as a scraper. It will be appreciated, as the description proceeds, that the inventive conrol system is also applicable to other types of vehicles.

The automatic lockup control system is shown in FIG. 1 in block diagram in combination with a vehicle driveline. The vehicle engine 10 is coupled in a conventional manner to the vehicle traction wheels 12 through a fluid torque converter 14 and a change speed transmission 16 in a serial connection. A lockup clutch 18 is connected in parallel with the torque converter 14 and when engaged, it provides a rigid coupling between the vehicle engine and the transmission, bypassing the torque converter. The lockup clutch 18 is controlled by the lockup control circuit 20 so that the clutch is either engaged or disengaged, i.e. in lockup or unlock condition. The lockup clutch is of conventional design and is hydraulically actuated under control of a solenoid valve. The transmission 16 is of conventional type and is provided with plural gear sets to provide a plurality of speed ranges having different ratios between the input and output shafts. The different gear sets are selected by hydraulic actuators under manual control. In the illustrative embodiment, the transmission has four manually selectable speed ranges and a manually selectable forward, neutral and reverse operating condition.

The lockup control circuit 20 provides an output signal, either a lockup or an unlock signal, to the lockup clutch in response to certain operating parameters of the vehicle driveline. The primary parameter is the speed of the output shaft of the torque converter 14. For this purpose, a speed sensor or signal generator 22 is coupled with the output turbine shaft of the torque converter and generates a speed signal which is applied to the control circuit 20. An additional control parameter is that of torque demand on the vehicle engine 10. For this purpose, a throttle position sensor 24 is actuated by the engine throttle linkage from the accelerator pedal and provides a torque demand signal to the lockup control circuit 20. The control circuit is also responsive to the operating condition of the change speed transmission 16, i.e. forward or reverse and the selected drive range. For this purpose, a shift controller 26 is employed to produce a drive direction signal and a drive range signal which are applied to the lockup control circuit 20. An on-off switch 28 is provided for the lockup control circuit to enable the operator to selectively initiate the automatic control of lockup.

Figure 2:
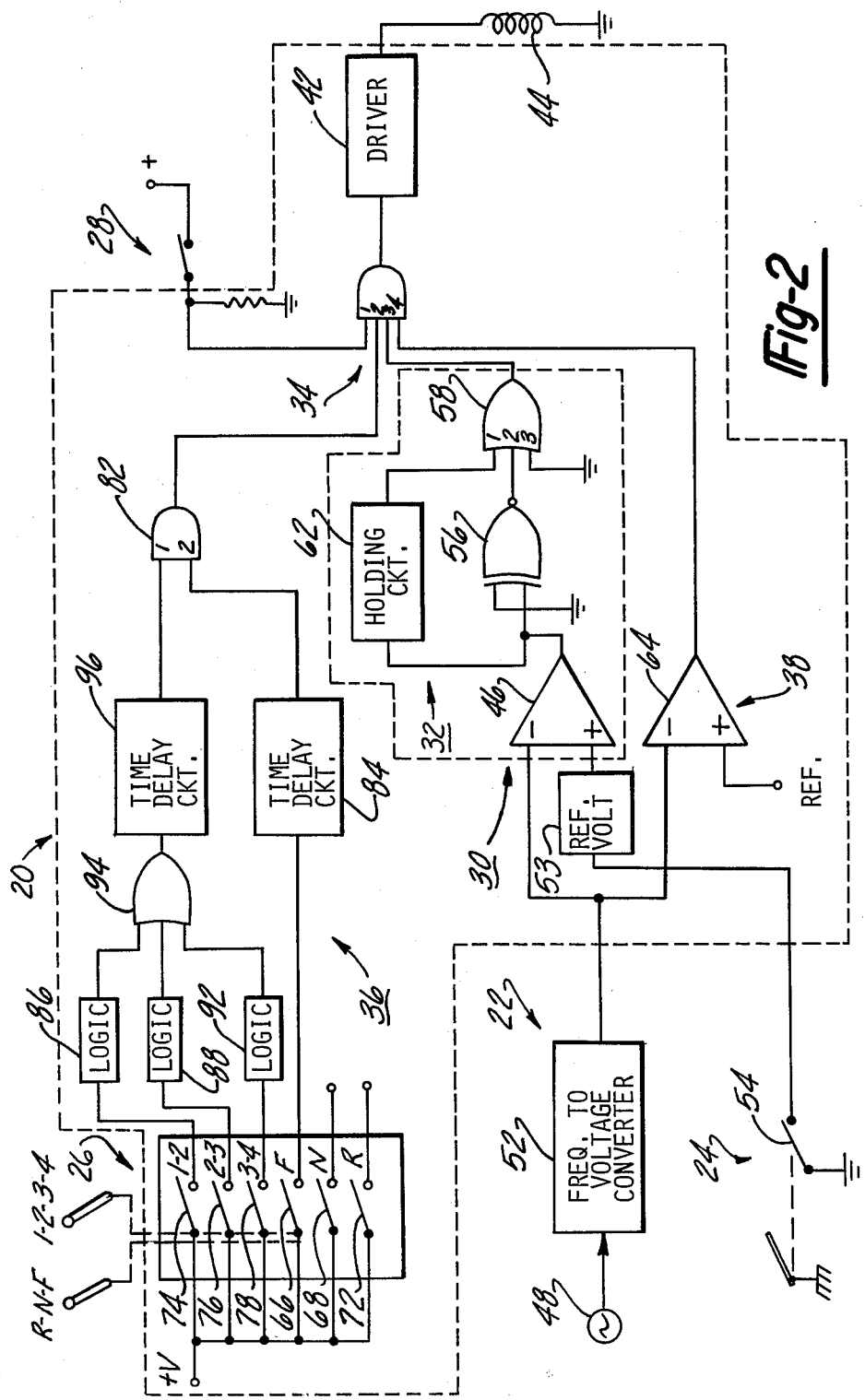
FIG. 2 is a schematic diagram of the automatic lockup control circuit.

Referring now to FIG. 2, the lockup control circuit 20 is shown in schematic diagram. The primary control for the automatic lockup system comprises a speed responsive signal generator or means 30 which is adapted to produce either a lockup or an unlock signal. The output of the speed responsive signal means 30 is applied through a signal holding circuit 32 to a logic AND gate 34. The output of the AND gate is applied to a driver circuit 42 which is adapted to energize the actuator or solenoid valve 44 to engage the lockup clutch.

The speed responsive signal means 30 will now be described in greater detail. It comprises a comparator 46 which is adapted to compare the actual speed signal of the torque converter output with a selected reference signal. For this purpose, a tachometer generator 48 is driven by the ouput turbine shaft of the torque converter and generates a signal having a frequency proportional to speed. The output of the tachometer generator is applied to a frequency-to-voltage converter 52 which develops a DC output voltage having a magnitude corresponding to the frequency of the input signal. The output of the converter 52 is applied to the inverting input of the comparator 46. In order to establish a predetermined speed at which the lockup clutch is to be engaged, a reference voltage source 53 is connected with the non-inverting input of the comparator 46. As will be described subsequently, the reference voltage source 53 is switchable between two reference voltage values in response to a change of torque demand on the engine. For this purpose, the throttle position sensor 24 comprises a switch 54 actuated by the throttle linkage. When the throttle is depressed, the switch 54 is open and provides a set point for normal automatic lockup at a first predetermined speed, for example 1800 RPM. With the throttle in idle position, the switch 54 is closed and the referrence voltage souce 53 provides a set point for retard automatic lockup at a second predetermined speed, for example 1200 RPM. When the speed voltage is less than the reference voltage, the output of the comparator 46 is at logic high; it goes to logic low when the speed voltage equals or exceeds the reference voltage. In order to prevent system hunting when the speed voltage is very close to the value which trips the comparator, the comparator is provided with switching hysteresis so that the comparator will have a trip-back point somewhat lower than its trip point. For example, for normal automatic lockup, the trip point is set at 1800 RPM and the trip-back point is set at 1750 RPM. For retard automatic lockup the trip point is set at 1200 RPM and the trip-back point is set at 1150 RPM.

The signal holding circuit 32 is adapted to apply the output of the comparator 46 to input 3 of the AND gate 34 and to hold the comparator output signal for a predetermined time interval. For this purpose, the output of the comparator 46 is applied to one input of an exclusive NOR gate 56 which has its other input held at logic low. The output of the exclusive NOR gate is connected to input 2 of an OR gate 58. Input 3 of the OR gate is held at logic low. The output of the comparator 46 is also applied to the input of a latch or holding circuit 62. The holding circuit is adapted to produce a logic high output for a predetermined time interval, for example three seconds, when it receives a logic low input. The output of the holding circuit 62 is applied to input 1 of the OR gate 58. Accordingly, when the output of the comparator 46 goes to logic low, the output of the exclusive NOR gate 56 goes to logic high. This causes the output of the OR gate 58 to go to logic high. At the same time, the transition to logic low on the output of the comparator 46 causes the holding circuit 62 to produce a logic high which is held on its output for a period of three seconds. Accordingly, the output of the OR gate 58, which is applied to the input of the AND gate 34 will be at logic high for at least three seconds even though speed variation might cause the output of the comparator 46 to return to logic high immediately after switching to logic low. This prevents unnecessary actuation of the lockup clutch.

As discussed above, the output of the speed responsive signal means 30 is applied to input 3 of the AND gate 34. When the output of the comparator 46 is at logic low, the output of the OR gate 58 is at logic high which causes the AND gate 34 to go to logic high, provide that the other inputs of the AND gate are also at logic high. If all inputs of the AND gate 34 are high the driver 42 energizes the actuator 44 and the lockup clutch is engaged. The other inputs of the AND gate 34 exercise control over the lockup clutch according to other operating parameters of the system.

In addition to control of the lockup clutch by the speed responsive signal means 30, control is also provided in accordance with the operating condition of the change speed transmission as provided by a transmission responsive signal generator 36. Also, control is provided in accordance with engine overspeed condition, as provided by an overspeed responsive signal generator 38. Further, as noted above, the lockup control circuit 20 may be turned on or off by the selector switch 28. These additional control circuits will be described below.

When the on-off switch 28 is closed, a logic high is applied to input 1 of the AND gate 34 and the lockup control circuit is operative to respond to the other control parameters for automatic control of the lockup clutch. When the on-off switch is open, it applies a logic low to the input of the AND gate 34 and the lockup control circuit is disabled.

The overspeed responsive signal generating means comprises a comparator 64. The speed signal from the frequency-to-voltage converter 52 is applied to the inverting input of the comparator 64 and a reference voltage is applied to the non-inverting input. The reference voltage is set at a predetermined value corresponding to engine overspeed, for example 3300 RPM. When the speed signal voltage is less than the reference voltage, the output of the comparator 64 is at logic high and constitutes an enabling signal at input 4 of the AND gate 34. When the speed signal is equal to or greater than the reference voltage, the output of the comparator 64 is at logic low and constitutes a disenabling signal at the input of the AND gate 34. In order to prevent hunting of the comparator 64 when the speed signal is very close to the pre-set trip point, it is provided with hysteresis. This causes the comparator to trip at the set point corresponding to the reference voltage value and to trip-back at a predetermined lower voltage. For example, the trip point is set at 3300 RPM and the trip-back point is set at 3250 RPM.

The transmission responsive signal generator 36 is adapted to produce an enabling signal at input 2 of the AND gate 34 when the transmission is in forward gear and also in certain selected drive ranges. It is adapted to produce a disenabling signal when the transmission is in reverse gear or in neutral or in first drive range. The shift controller 26 is actuated by the shift control levers of the operation shift quadrant for selecting drive direction and drive range of the transmission. It includes selectively actuable switches 66, 68 and 72 respectively for manual selection of the forward, neutral and reverse operation of the transmission. It also includes drive range switchers 74, 76 and 78 for manual selection of second range, third range and fourth range respectively.

The transmission responsive signal generator 36 has plural inputs connects with the individual switches of the shift controller 26 and has a single output connected to input 2 of the AND gate 34. The output of the signal generator 36 is developed by an AND gate 82 which receives an input from the forward selector switch 66 through a time delay circuit 84. If the forward selector switch 66 is open, a logic low voltage will be applied through the time delay circuit 84 to input 2 of the AND gate 82 and the output thereof will be at logic low, constituting a disenabling signal for the AND gate 34. If the forward selector switch 66 is closed, the output thereof will be at logic high which will be applied through the time delay circuit 84 to the AND gate 82 which, if its other input is also at logic high, will develop a logic high output constituting an enabling signal for the AND gate 34. The time delay circuit 84 produces a time delay of about 2.5 seconds in trasmitting a logic high from the forward selector switch 66 to the input of the AND gate 82. This time delay is provided to minimize the mechanical shock in the drive line in the event that the direction control lever is moved from reverse through neutral with the torque converter at high enough speed to engage the lockup clutch.

In order to produce an enabling signal on input 2 of the AND gate 34 when the drive direction selector is in forward and when the drive range selector is in the speed range above first range, each of the range selector switches 74, 76 and 78 are connected respectively through logic circuits 86, 88 and 92 to respective inputs of an OR gate 94. When any one of the switches 74, 76 or 78 is closed, a logic high voltage is applied through the respective logic circuit to the respective input of the OR gate 94. This causes the OR gate to produce a logic high output which is applied through a time delay circuit 96 to input 1 of the AND gate 82. Thus, the output of the AND gate 82 is at logic high constituting an enabling signal on input 2 of AND gate 34. The logic circuits 86, 88 and 92 are provided to produce momentary unlock of the torque converter during any change of drive range by actuation of the switches 74, 76 or 78 to reduce drive line shock during transmission shift. For this purpose, each of the logic circiuit 86, 88 and 92 are adapted to produce a momentary logic high pulse in response to opening or closing of the respective switch at its input, as will be described subsequently. The momentary logic high pulse is applied through the OR gate 94 to the input of the time delay circuit 96 which produces a logic low output for a predetermined time interval, for example about one second. This momentary logic low signal on input 1 of the AND gate 82 causes it to go to logic low which constitutes a momentary disenabling signal applied to input 2 of the AND gate 34. Before describing the overall operation of the lockup control circuit 20, the speed responsive signal means 30 and the overspeed responsive signal generator 38 will be described in greater detail with reference to FIG. 3. Also, the transmission responsive signal generator 36 will be described in greater detail with reference to FIG. 4.

Figure 3:
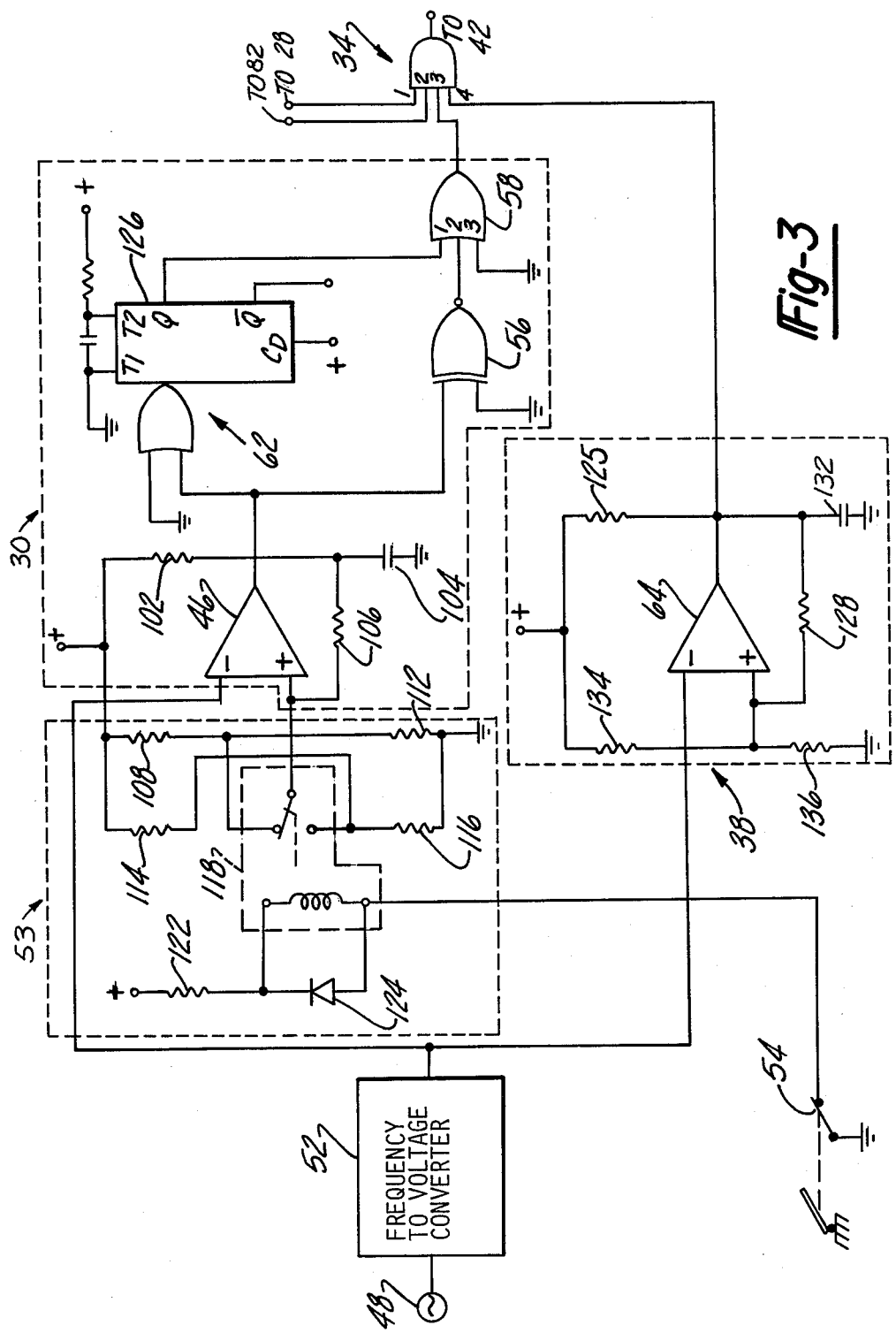
FIG. 3 is a schematic diagram of the speed signal responsive generating means for normal automatic lockup and overspeed responsive signal generating means for overspeed automatic lockup.

FIG. 3 is a schematic diagram of the speed responsive signal means 30 and the overspeed responsive lockup signal generating means 38. The speed responsive signal means 30 will be described first.

The speed signal developed by the frequency-to-voltage converter 52 is applied as a DC voltage to the inverting input of the comparator 46. The DC reference voltage is applied to the non-inverting input. The comparator converts the DC or analog signals into digital data at the output of the comparator. The ciomparator 46 is provided with a pull-up resistor 102 connected between the supply voltage and the output of the comparator. A capacitor 104 is connected between the output and ground to assure sharp transition between the on-off states of the output. A feedback resistor 106 is connected between the output and the non-inverting input to provide a small amount of positive feedback to cause the comparator to switch fully and prevent oscillation. The reference voltage source 53, which was referred to in FIG. 2, is provided by a voltage divider network; the network is switchable to provide two different set points for the lockup control and to provide switching hysteresis, as discussed previously. For this purpose, the voltage divider network cmprises a pair of resistors 108 and 112 connected in series between the voltage source and ground. It also comprises a pair of resistors 114 and 116 connected in series between the voltage source and ground. The network is switchable by a reed relay 118 which is controlled by the switch 54 actuated by the throttle linkage. The reed relay has its movable contact connected with the non-inverting input of the comparator 46 and its normally closed contact connected with the junction of resistors 108 and 112. Its normally open contact is connected with the junction of resistors 114 and 116. The reed relay coil is connected in series with a resistor 122 between the voltage source and the switch 54. A protective diode 124 is connected across the coil of the reed relay. When the vehicle throttle is depressed and switch 54 is open, the movable contact of the reed relay is connected to the junction of resistors 108 and 112. The voltage divider network, in combination with feedback resistor 106 provides the set point and hysteresis for the normal automatic lockup control at 1800 RPM and 1750 RPM. With the vehicle throttle at idle, the switch 54 is closed and the movable contact of the reed relay is connected at the junction of resistors 114 and 116. The voltage divider network, in combination with feedback resistors 106 provides the set point and hysteresis for the retard automatic lockup control at a trip point of 1200 RPM and a retrip point of 1150 RPM. The digital output of the comparator 46 is applied through the exclusive NOR gate 56 to input 2 or the OR gate 58. It is also applied through the holding circuit 62 to input 1 of the OR gate 58. When the speed signal applied to the comparator 46 exceeds the reference signal, the output of the comparator 46 goes to logic low. This causes the output of the exclusive NOR gate 56 to go to logic high and this is applied to the AND gate 34 to energize the lockup clutch. The logic low output of the comparator 46 is also applied to the input of the holding circuit 62. This holding circuit is a monostable multivibrator or one-shot 126. The Q output of the one-shot is applied to input 1 of the OR gate 58. When the input of the one-shot receives a negative going voltage the Q output goes to logic high and remains at logic high for a predetermined interval, for example, three seconds. The one-shot is retriggerable so that the Q output remains high for three seconds following the latest negative going input voltage. Accordingly, when the speed signal becomes equal to or greater than the reference signal at the comparator 46, the output thereof goes to logic low, the Q output of the one-shot 126 goes to logic high and remains high for three seconds. This is applied to the OR gate 58 which, in turn, applies a logic high to input 3 of the AND gate 34 and holds the lockup clutch engaged for the three second interval, even though the speed voltage drops below the retrip point in less than three seconds after it reached the trip point.

The overspeed signal generator 38 will now be described with reference to the schematic of FIG. 3. It comprises the comparator 64 having its inverting input connected with the frequency-to-voltage converter 52 and its non-inverting input connected to a source of reference voltage. A pull-up resistor 125 is connected between the voltage source and the output of the comparator and a feedback resistor 128 is connected between the output and the non-inverting input of the comparator. A capacitor 132 is connected between the output of the comparator and ground. The reference voltage for the comparator is provided by a voltage divider network comprising resistors 134 and 136 connected in series between the voltage source and ground. The junction of resistors 134 and 136 are connected to the non-inverting input of the comparator. The output of the comparator 64 is to input 4 of the AND gate 34. The reference voltage divider network in combination with the feedback resistor 128 at the non-inverting input provides a set point and switching hysteresis such that the comparator has a trip point at a speed signal corresponding to 3300 RPM and a retrip point at 3250 RPM. When the speed signal becomes equal to or greater than the trip point, the output of the comparator 64 goes to logic low which constitutes a disenabling signal applied to the AND gate 34 to disenable converter lockup. When the speed signal is less than the retrip point, the output of the comparator 64 is at logic high which constitutes an enabling signal at the AND gate 34 to enable converter lockup.

Figure 4:
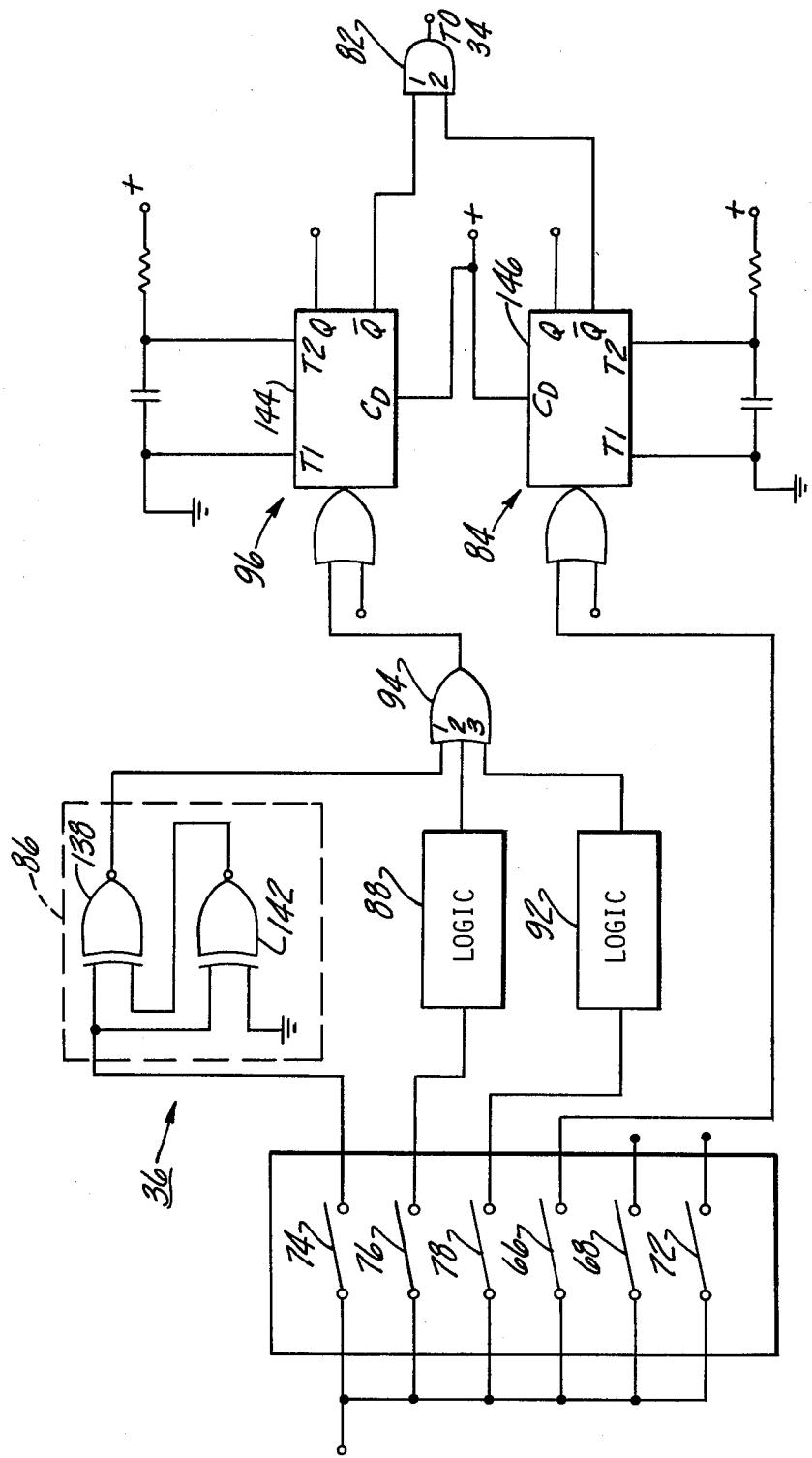
FIG. 4 is a schematic diagram of the transmission responsive signal generating means.

The transmission responsive signal generator 36 will now be described with reference to the schematic diagram of FIG. 4. As discussed above, this circuit provides an enabling signal to the AND gate 34 when the transmission is in forward drive unless it is in the first drive range. If the transmission is in reverse drive or neutral, or if it is in the first drive range, it provides a disenabling signal to the AND gate 34. Further, this circuit provides a momentary disenabling signal in response to each change, whether upshift or downshift, of the transmission drive range. This circuit comprises, in general, the logic circuits 86, 88 and 92 connected respectively between the drive range selector switches 74, 76 and 78 and the respective inputs of the OR gate 94. The output of the OR gate 94 is connected through the time delay circuit 96 to input 1 of the AND gate 82. Also, the time delay circuit 84 is connected between the output of the forward selector switch 66 and input 2 of the AND gate 82. The output of the AND gate 82 is connected to input 2 of AND gate 34.

The logic circuit 86 comprises a pair of exclusive NOR gates 138 and 142 connected to provide an output pulse of short duration in response to either opening or closing of the selector switch 74 for transition between drive ranges 1 and 2. For this purpose, the switch 74 is connected to input 1 of gate 138 and to input 1 of gate 142. Input 2 of gate 142 is connected to ground. The output of gate 142 is applied to input 2 of gate 138. Due to this connection and the propagation delay inherent in the gates, a short output pulse is produced at the output of gate 138 in response to both closing and opening of selector switch 74. Logic circuit 88 and logic circuit 92 are identical to logic circuit 86. When any of the logic gates 86, 88 and 92 produces a logic high pulse, the OR gate 94 produces a logic high pulse which is applied to the input of the time delay circuit 96. This circuit comprises a monostable multivibrator or one-shot 144 having its input connected with the output of the OR gate 94. The $\overline{Q}$ output of the one-shot 144 is applied to input 1 of the AND gate 82. The one-shot 144 is operative, in response to receipt of an input pulse, to produce a logic low at its $\overline{Q}$ output for a predetermined time interval, for example one second, after receipt of the input pulse. It is retriggerable so that the $\overline{Q}$ output will remain at logic low for one second after receipt of the last input pulse. When the $\overline{Q}$ is at logic low, the output of AND gate 82 is at logic low which constitutes a disenabling pulse at input 2 of the AND gate 34. Thus, the opening or closing of any of the drive range selector switches 74, 76 or 78 will cause the output of the AND gate 82 to go to logic low and cause the AND gate 34 to produce an unlock signal of about one second duration.

In order to produce a short duration unlock signal when the forward selector switch 66 is closed the time delay circuit 84 is provided. This circuit comprises a monostable multivibrator or one-shot 146. This one-shot is the same as the one-shot 144 except that it is adapted to provide a time delay of about three seconds. Accordingly, when forward selector switch 66 is closed, the positive going pulse at the input of the one-shot 84 causes the $\overline{Q}$ output thereof to go to logic low to remain at logic low for about three seconds. When the $\overline{Q}$ output is at logic low, the output of the AND gate 82 is at logic low which constitutes a disenabling signal at input 2 of AND gate 34. Accordingly, whenever the transmission is shifted from reverse through neutral to forward, the lockup clutch will be disenabled for a period of three seconds. After the three second time delay, the $\overline{Q}$ output of the one-shot 146 will go to logic high. This causes the output of the AND gate 82 to go to logic high which constitutes an enabling signal so that the lockup clutch may be engaged.

The operation of the lockup control circuit will be described with reference to FIG. 2. When the on-off switch 28 is open, a disenabling signal is applied to the AND gate 34 and the lockup clutch cannot be engaged. With the on-off switch closed, an enabling signal is applied to input 1 of the AND gate 34 and the control circuit is operative to engage or disengage the lockup clutch according to the respective inputs.

When the operator shifts the transmission to neutral or reverse, the forward selector switch 66 is open and a logic low is applied to input 2 of AND gate 82. This causes the output of the AND gate 82 to be at logic low and a disenabling signal is applied to input 2 of AND gate 34. Accordingly, the lockup clutch cannot be engaged. If the operator places the transmission in forward drive, the forward selector switch 66 is closed and a logic high is applied to the input 2 of AND gate 82 after a time delay of three seconds interposed by the time delay circuit 84. If the operator further places the transmission in first drive range, the selector switches 74, 76 and 78 are open and a logic low is applied through the OR gate 94 to the time delay circuit 96 and the output thereof is at logic low. This causes the output of the OR gate 82 to be at logic low which constitutes a disenabling signal at input 2 of the AND gate 34. Accordingly, the lockup clutch cannot be engaged in this operating condition. If however, the operator places the transmission in forward and shifts to the second drive range, the selector switch 74 is closed and a logic high is applied through the OR gate 94 and the time delay circuit 96 to the input 1 of the AND gate 82. The output of the AND gate 82 goes to logic high which constitutes an enabling signal applied to the input 2 of the AND gate 34. This permits the lockup clutch to be engaged or disengaged in accordance with the state of the speed responsive signal 30 and the state of the overspeed signal generator 38.

With the vehicle operating in a work mode, the throttle is normally depressed and the transmission is in one of the lower drive ranges with the speed of the output shaft of the torque converter being less than 1800 RPM. The reference voltage source 53 will be at the set point corresponding to 1800 RPM. In this condition, the output of the speed responsive signal means 30 is at logic low on input 3 of the AND gate 34. Accordingly, the torque converter is in the unlock condition. If however, the operating conditions change so that the output speed of the torque converter increases above 1800 RPM, the output of the comparator 46 will go to logic low and the output of OR gate 58 will go to logic high at input 3 of the AND gate 34. This will cause the lockup clutch to be engaged. It is noted that because of the holding circuit 62, the output of OR gate 58 will remain at logic high for three seconds even though the higher speed of the torque converter output shaft does not persist for that length of time. If the operating conditions should change again so that the speed of the torque converter output shaft drops below 1750 RPM, which is the trip-back point of the comparator 46, the output of the comparator will go to logic high which will cause the output of AND gate 34 to go to logic low and the lockup clutch will be disengaged.

If the vehicle is operated in the travel mode with the transmission in drive range 2 or higher and the throttle depressed, the reference voltage source 53 for comparator 46 will be at the higher set point with a trip point of 1800 RPM. When the speed voltage reaches a value corresponding to 1800 RPM, the output of the comparator 46 will go to logic low and the OR gate 58 will produce a logic high which is applied to the input 3 of AND gate 34. This will cause the lockup clutch to be engaged. The lockup clutch will remain engaged for speeds above the retrip speed of 1750 RPM. If the vehicle should start down a long steep hill, the vehicle speed will increase, and with the lockup clutch engaged, the engine speed will increase. If the engine speed should exceed the pre-set overspeed value of 3300 RPM, The comparator 64 of the overspeed lockup signal generator, will trip and produce a logic low output which constitutes a disenabling signal at input 4 of the AND gate 34. Accordingly, the lockup clutch will be disengaged and the torque converter will be interposed between the traction wheels and the engine with the effect of reducing engine speed. When the engine speed is reduced to the retrip point of 3250 RPM the output of comparator 64 will go to logic high which constitutes an enabling signal at input 4 of AND gate 34 and the lockup clutch will be re-engaged.

Assume that the vehicle continues on a gradual downhill grade with the torque converter in the lockup condition. The lockup clutch will remain engaged so long as the speed of the torque converter output shaft is greater than the trip-back speed of 1750 RPM, regardless of whether the throttle is depressed or in idle condition. With the lockup clutch engaged, engine braking may be provided. If the throttle is depressed, the switch 54 will be open and the reference voltage source 53 will provide the higher set point with a trip-back point of 1750 RPM. When the speed is reduced to this trip-back point, under these operating conditions, the lockup clutch will be disengaged. If however, the throttle is in the idle position, the reference voltage circuit 52 will provide a retrip point of 1150 RPM and engine braking will be continued until the speed of the torque converter output shaft is reduced to 1150 RPM. At that point, the lockup clutch will be disengaged. If the speed should be increased until it exceeds 1200 RPM, the trip point of the comparator 46, with the throttle in the idle condition, the lockup clutch will be re-engaged. If however, the speed is increased with the throttle depressed, the high set point will be invoked, and the lockup clutch will remain disengaged until the trip point of 1800 RPM is reached. In the event that the transmission is shifted from one drive to another by one of the selector switches 74, 76 or 78, the respective logic circuits 86, 88 or 92 will cause the time delay circuit 96 and the AND gate 82 to produce a momentary disenabling signal at input 2 of AND gate 34. This causes momentary disengagement of the lockup clutch during the transition from one drive range to another to minimize the shock in the driveline.

Although the description of this invention has been given with reference to a particular embodiment, it is not to be construed in the limiting sense. Many variations and modifications will now occur to those skilled in the art. For a definition of the invention, reference is made to the appended claims.

What is claimed is:

1. An automatic lockup control system for use in a vehicle of the type having an engine coupled with traction wheels through a driveline, said driveline including a torque converter and a change-speed transmission in series arrangement and a lockup clutch in parallel arrangement with the torque converter, said lockup clutch including a lockup actuator, said automatic lockup control system comprising:

a speed signal generator coupled with said driveline and adapted to produce a speed signal corresponding to the speed of a selected part of said driveline, said lockup actuator being adapted to selectively engage and disengage the lockup clutch in response to lockup and unlock signals respectively, lockup signal means including signal comparing means and being coupled between the speed signal generator and the lockup actuator and being adapted to produce a lockup signal when the value of the speed signal exceeds a reference value and to produce an unlock signal when the value of the speed signal is less than said reference value, reference signal means coupled with the lockup signal means for supplying a reference signal thereto and including switching means for changing the reference signal between a first predetermined value and a second predetermined value when the switching means is actuated, and torque demand responsive means coupled with said reference signal means for actuating said switching means in response to a change in the torque demand on said engine.

2. The invention as defined in claim 1 wherein said speed signal generator is coupled with the output shaft of said torque converter.

3. The invention as defined in claim 2 wherein said signal comparing means comprises a comparator having a first input connected with said speed signal generator and second input connected with said reference signal means.

4. The invention as defined in claim 3 wherein said engine includes a throttle, an actuator for the throttle and wherein said condition responsive means is a switch actuated by the actuator.

5. The invention as defined in claim 1 wherein said lockup signal means includes off set means for inhibiting the generation of a unlock signal until the speed signal value differs from the reference signal value by a predetermined amount.

6. The invention as defined in claim 3 including, logic means having one input coupled with the lockup signal means and an output coupled with the lockup actuator, a first enabling signal means comprising a second comparator, a second reference signal means adapted to produce an overspeed reference signal having a value corresponding to a predetermined high engine speed, said second comparator having a first input coupled with said speed signal generator, a second input coupled with said second reference signal means, and an output coupled with a second input of said logic means, said second comparator being adapted to produce an enabling signal when the value of the speed signal is less than said overspeed reference signal and a disenabling signal when the value of the speed signal is greater than said overspeed reference signal.

7. The invention as defined in claim 6 wherein, said change speed transmission includes drive direction control means and drive range control means, a second enabling signal means including a first switching means connected with said drive direction control means, second logic means coupled between said first switching means and said first logic means for producing an enabling signal when said first switching means corresponds to forward direction and for producing a disenabling signal when said first switching means corresponds to reverse drive direction.

8. The invention as defined in claim 7 including, time delay means coupled between said first switching means and said second logic means for causing said second logic means to produce said enabling signal a predetermined time delay after operation of said first switching means.

9. The invention as defined in claim 7 wherein, said second enabling signal means includes a second switching means connected with said drive range control means, third logic means coupled between said second switching means and said first logic means for producing an enabling signal when said second switching means corresponds to selected drive ranges and for producing a disenabling signal when said second switching means corresponds to at least one drive range.

10. The invention as defined in claim 9 including,
second time delay means coupled between said second switching means and said third logic means for causing said second logic means to produce a disenabling signal for a predetermined time interval in response to a change of state of said second switching means.

11. The invention as defined in claim 1 or 6 including, lockup signal holding means coupled between said lockup signal means and the actuator means for holding a lockup signal for a predetermined time interval after occurrence of a lockup signal from said lockup signal means.

* * * * *